Patented Mar. 8, 1927.

1,619,826

UNITED STATES PATENT OFFICE.

CARL MARX, OF WYOMING, NEW JERSEY, ASSIGNOR OF ONE-HALF TO RUDOLPH WEISS, OF NEW YORK, N. Y.

PREPARATION OF CONCENTRATED ONION JUICE. REISSUED

No Drawing. Application filed October 20, 1925. Serial No. 63,767.

In the preparation of concentrated fruit juices, such as those of the grape, loganberry, raspberry and the like, the usual procedure is to express the juice from the said fruits either before or after cooking and heating the fruit so as to render the same softer and the soluble constituents thereof easier of extraction. In expressing the juice any suitable means, such as a fruit press or the like may be employed. In concentrating the resultant partially clarified fruit juice, the same is heated to the boiling point and the evaporation of the excess water is effected without any particular precaution being exercised to guard against the loss of volatile ingredients, as these are present in such fruit juices as above mentioned only in a small and negligible degree.

When preparing concentrated juices of certain vegetables, however, such as the juice of the onion, of celery, celery root and other aromatic and odoriferous vegetables or vegetable products, the above outlined procedure would not result in a suitable and merchantable concentrated fruit product, as in the course of heating the said juice the volatile and flavor-imparting constituents would become volatilized and lost. At the same time, due to the high water content of the said vegetables, such as onion, celery, celery root, etc., it becomes necessary, in order to conserve space and weight in the finished product, to eliminate at least a part of the water which is present in the said vegetables, by evaporation or otherwise.

I have discovered that concentrated onion juice or concentrate can be prepared successfully and economically by the following process, although I do not wish to limit myself to the exact procedure outlined, but desire it to be definitely understood that the sequence of the operation may be altered without departing in any way from the spirit of this my invention.

The preparation of concentrated onion juice, in accordance with the present invention, can be carried out successfully in the following manner, to wit:

The onions, which may be either red or white, or other variety, are first carefully cleaned by washing and are then peeled of their outer, dry skins by known means, such as rapidly tumbling the same in a peeling machine which consists of a rapidly rotating disc of emery or equivalent abrasive material while under a rapid current of water to carry away the removed peelings.

The onions are then ground up to a relatively fine pulp, by either passing through a machine analogous to a meat chopper or any other device capable of finely dividing the onions. This operation is, preferably, carried out in a closed apparatus to avoid the loss of the volatile and pungent constituents of the onion, while at the same time making this operation much less troublesome to the operator.

The onion pulp thus obtained, and which contains approximately ninety three per cent of water, is then transferred to a suitable evaporating vessel, which may be of any material such as glass-lined steel tanks, enamelled tanks, tin-lined tanks or aluminum tanks, or of any metal which will not introduce any harmful and deleterious metallic element into the said juice. While in this evaporating vessel the onion pulp is subjected to a process of heating or boiling, either at ordinary atmospheric pressure, or above or below the said pressure, but I prefer to carry out this operation at the ordinary pressure of the atmosphere at this stage of the process. The pulp having been brought to the boiling point, the vapors escaping from the evaporating vessel are condensed by suitable condensing means, such as for example a coil of tin-lined pipe surrounded by cold water. The condensate is saved. Approximately one tenth by weight of the original onion pulp is thus distilled off and the distillate collected and preserved in closed vessels and stored for use later as will be shown below.

Following the first evaporating off of the one tenth as above described, and which one tenth will be found to contain most of the volatile and pungent constituents of the onion, the evaporation or boiling of the remainder of the pulp is continued, either at atmospheric pressure, or in a partial or complete vacuum, until the total bulk of the said pulp has been reduced to approximately one half of the original volume. Although I can operate at atmospheric pressure, I find it advisable in order to economize time, and also to avoid injuring the onion pulp by too prolonged heating at a higher temperature to carry out this phase of the process at reduced pressure. The distillate arising from this evaporation need not be retained as it contains only minimal amounts of valuable volatile materials.

When the evaporation has proceeded to the desired degree, say to one half of the original bulk, the contents of the evaporating vessel are mixed, preferably by means of mechanical stirrers which may be installed in such vessel, with a small percentage, say from two to three per cent, of an absorbing medium such as refined kieselguhr or infusorial earth, preferably of the type sold in the United States under the name of Filter-cell. This is to allow of more rapid and even filtration of the pulp. After mixing in the said Filter-cell, the onion pulp is filtered by mechanical means, such as by suction filters, or by filter presses, or by any suitable means now known, the residue being strongly compressed so as to remove as much as possible of the liquid constituents. The remaining compressed pulp can, if desired, be washed with a small amount of water.

The resultant, more or less clear filtrate is then either used directly for the next step, or, if a more concentrated extract is desired, can be evaporated further either in the same evaporating vessel, or one like it, and the bulk reduced to any desired extent, as for example, to again one half of the volume, so that the final concentration will thus be four-fold as calculated on the original bulk of the onion pulp.

In either case, that is whether the juice has been further concentrated or not, the concentrated juice resulting from the preceding operation is then admixed with the distillate obtained during the first evaporating step, and which distillate has been stored out of contact with the air for this purpose, as aforesaid. This will result in the re-introduction into the concentrated onion juice of the volatile and pungent aromatic flavoring ingredients which would have ordinarily been lost when boiling the onion juice had the precaution of collecting the first one tenth of the distillate not been taken. This is the essential feature of this invention.

The combined volatile distillate and concentrated juice will then be in the form of a more or less cloudy liquid as the admixture of the juice with the distillate gives rise to certain reactions the nature of which is not yet clearly defined theoretically. In any event, the combined volatile distillate and concentrated juice is then admixed with a small percentage of the Filter-cell already mentioned before and is again filtered or otherwise clarified. As an alternative to filtration I may substitute, with equal effect, a centrifugal clarification such as is commonly carried out in rapidly revolving centrifugal machines known in the trade as super-centrifugals, as for example that made by the De Laval Separator Co. or the Sharpless Centrifugal.

The final clear juice or onion concentrate thus obtained is then bottled in suitable containers. As a further precaution the bottled juice can be pasteurized or sterilized in the bottle; or, alternatively, a small percentage not over one tenth of one percent, of an approved preservative, as, for example, sodium benzoate, may be added to prevent fermentation or deterioration of the juice with time.

I wish to distinctly point out that the filtration of the onion pulp may with equally good results be effected before the first evaporation, and the onion pulp may be filtered or pressed in the raw state, although in this case the pressure employed must be greater and the operation must be carried out in carefully enclosed containers to prevent undue loss of the volatile constituents. If this alternative is adopted, the boiling will be somewhat easier, but the juice on boiling will precipitate a certain amount of albuminoid matter which renders the subsequent filtration not quite as easy as if the boiling be carried out in the presence of all of the insoluble solids of the onion as first described above.

In any case the first one tenth of the distillate resulting from the heating of the onion pulp or onion juice is saved and afterwards re-incorporated with the concentrated liquid or juice as aforesaid.

What I claim and desire to secure by Letters Patent is:

Method of preparing concentrated onion juice, consisting in boiling comminuted onions in a closed container, collecting only the first one-tenth of the distillate produced, continuing the boiling until the total bulk of comminuted onions has been reduced to at least one half of the original bulk, filtering the mass of softened onion pulp thus formed, and re-incorporating with the resultant filtrate the first one-tenth of the distillate obtained during the early part of the boiling operation, substantially as described.

In witness whereof I hereunto affix my signature.

CARL MARX.